(12) United States Patent
Kobayashi et al.

(10) Patent No.: US 7,525,061 B2
(45) Date of Patent: Apr. 28, 2009

(54) COVER MEMBER FOR PUSH-BUTTON SWITCH AND METHOD OF MANUFACTURING THE SAME

(75) Inventors: Takato Kobayashi, Kodama-gun (JP); Tomohiro Nozaki, Kodama-gun (JP); Kimihiko Watanabe, Kodama-gun (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 10/593,919

(22) PCT Filed: Mar. 15, 2005

(86) PCT No.: PCT/JP2005/004536

§ 371 (c)(1), (2), (4) Date: Sep. 22, 2006

(87) PCT Pub. No.: WO2005/093770

PCT Pub. Date: Oct. 6, 2005

(65) Prior Publication Data

US 2007/0199814 A1 Aug. 30, 2007

(30) Foreign Application Priority Data

Mar. 25, 2004 (JP) .............................. 2004-088189

(51) Int. Cl.
*H01H 13/14* (2006.01)
(52) U.S. Cl. ..................................................... 200/520
(58) Field of Classification Search ......... 200/512–515, 200/520, 5 A, 5 R, 159 B, 293, 294, 295, 200/296, 302, 340, 243; 361/680, 749, 786, 361/803, 804
See application file for complete search history.

(56) References Cited

U.S. PATENT DOCUMENTS 3,995,126 A * 11/1976 Larson ........................ 200/5 A
4,021,630 A * 5/1977 Taylor ........................ 200/512
4,532,575 A * 7/1985 Suwa ......................... 361/680

(Continued)

FOREIGN PATENT DOCUMENTS

CN 1425970 6/2003

(Continued)

OTHER PUBLICATIONS

International Search Report for PCT/JP2005/004536 dated Apr. 26, 2005 (2 pages).

(Continued)

*Primary Examiner*—Edwin A. Leon
(74) *Attorney, Agent, or Firm*—Osha • Liang LLP

(57) ABSTRACT

A cover member for a push-button switch is disclosed, the cover member including a hard base and a keypad, wherein the hard base is made of a hard resin with a through hole for a key top, wherein the keypad is made of a silicone rubber film, and a front surface of the keypad is in contact with an entire back surface of the hard base, thereby preventing the entire back surface of the hard base from being contact with any member other than the keypad, and wherein the keypad is exposed through the through hole, and a back surface of the keypad corresponding to the through hole is provided with a press projection for pressing a contact point.

11 Claims, 7 Drawing Sheets

U.S. PATENT DOCUMENTS

| | | | | | |
|---|---|---|---|---|---|
| 4,540,865 | A | * | 9/1985 | Calder | 200/512 |
| 4,571,466 | A | * | 2/1986 | Iida | 200/513 |
| 5,366,805 | A | * | 11/1994 | Fujiki et al. | 428/412 |
| 5,367,133 | A | * | 11/1994 | Schmidt et al. | 200/5 A |
| 6,238,771 | B1 | * | 5/2001 | Nakao | 200/512 |

FOREIGN PATENT DOCUMENTS

| | | |
|---|---|---|
| JP | 5174658 | 7/1993 |
| JP | 6171021 | 6/1994 |
| JP | 7-8927 | 2/1995 |
| JP | 2687832 | 8/1997 |
| JP | 10-264203 | 10/1998 |
| JP | 2003-178639 | 6/2003 |
| JP | 2003311777 | 11/2003 |
| JP | 2004-1297 | 1/2004 |
| JP | 2004-327417 | 11/2004 |
| JP | 2004-327420 | 11/2004 |

OTHER PUBLICATIONS

Japanese Utility Application Laid-Open No. 07-008927 dated Feb. 7, 1995 (4 pages).

esp@cenet Patent Abstract for JP2004327420 dated Nov. 18, 2004 (1 page).

esp@cenet Patent Abstract for JP2003178639 dated Jun. 27, 2003 (1 page).

Patent Abstracts of Japan Publication No. 06-171021 (for Patent No. 2687832); publication date Jun. 21, 1994 (2 pages).

esp@cenet Patent Abstract for JP2004001297 dated Jan. 8, 2004 (1 page).

esp@cenet Patent Abstract for JP10264203 dated Oct. 6, 1998 (1 page).

esp@cenet Patent Abstract for JP2004327417 dated Nov. 18, 2004 (1 page).

Office Action in Japanese Patent Application No. 2006-511432, mailed Oct. 28, 2008, 2 pages.

English Patent Abstract of JP2003-311777 from esp@cenet, published Nov. 5, 2003, 1 page.

English Patent Abstract of JP5174658, published Jul. 13, 1993, 1 page.

Office Action in Korean Patent Application No. 10-2006-7022189, dated Oct. 29, 2008 (2 pages).

English abstract of JP6171021 from esp@cenet.com, published Jun. 21, 1944 (1 page).

Office Action in Chinese Patent Application No. 200580008530.X, dated Jan. 23, 2009 (5 pages).

English Abstract of CN1425970 from esp@cenet, published Jun. 25, 2003 (1 page).

* cited by examiner

COVER MEMBER FOR PUSH-BUTTON SWITCH AND METHOD OF MANUFACTURING THE SAME

TECHNICAL FIELD

The present invention relates to a push-button switch cover member used in portable terminal equipment such as cell phones and personal digital assistants (PDAs), and a production method thereof.

BACKGROUND ART

A cover member for push-button switches with multiple keys (push buttons) for manipulation of switches is used in the portable terminal equipment such as cell phones and personal digital assistants (PDAs). The multiple push buttons forming the cover member for push-button switches are arranged in a keypad made of an elastomer member such as silicone rubber.

Incidentally, there are strong desires for downsizing of the portable terminal equipment and strong desires, particularly, for reduction of thickness of the key unit. For meeting such desires, the thickness of the keypad made of the elastomer member is recently reduced to the extreme.

The portable terminal equipment adopts a back-lighting function using a light source such as LED, in order to enhance visibility in dark places. In such portable terminal equipment, in order to enhance uniformity of light emitted from the light source, an optically transparent elastomer member is used as the keypad. However, reduction in the thickness of the optically transparent elastomer member leads to failure in exhibiting satisfactory lightguide performance.

Consequently, a lightguide member made of a highly transparent hard resin with high lightguide performance was separately formed and this lightguide member was incorporated between the keypad and the key tops. This achieved an improvement in the lightguide performance. However, it resulted in deteriorating working efficiency of assembly with increase in the number of parts. Furthermore, it is difficult to secure a space for the lightguide member in the recent downsized low-profile portable terminal equipment.

There is thus a proposal, for example, on a luminescent cover as shown in FIG. 7, as a hard base-key unit (cf. FIG. 1 in Japanese Patent Application Laid-Open No. 2003-178639).

The luminescent cover 10 shown in FIG. 7 is used in combination with a circuit board 20. This luminescent cover 10 is provided with a hard base 12, a keypad 15, and a key top 17. The hard base 12 is made as a hard resin plate having a through hole 11. This hard base 12 is provided with an insert port for insertion of a light emitting device 13 at any desired position.

The keypad 15 is made of a rubberlike elastomer film and has a press projection 16. The keypad 15 is integrated with the hard base 12 through an adhesive. A portion of the keypad 15 closes the through hole 11 of the hard base 12. The press projection 16 formed on the keypad 15 is provided for turning on and off a metal dome switch 21 on the circuit board 20. The key top 17 is disposed on the top surface of the keypad 15.

DISCLOSURE OF THE INVENTION

Problem to be Solved by the Invention

In the above-described conventional technology, the hard base 12 and the circuit board 20 are in direct contact. In this configuration, stress due to an impact on the hard base 12 or deformation of the hard base is transferred directly to the circuit board 20, so as to possibly cause an unexpected trouble.

In order to solve the above problem, an object of the present invention is to provide a push-button switch cover member capable of alleviating influence on a circuit board due to an impact on the hard base and deformation of the hard base, and a production method thereof.

Means for Solving the Problem

A push-button switch cover member according to the present invention is a cover member for a push-button switch comprising a hard base and a keypad, wherein the hard base is made of a hard resin with a through hole for a key top, and wherein the keypad is made of a silicone rubber film, a front surface of the keypad is in contact with an entire back surface of the hard base, the keypad is exposed through the through hole, and a back surface of the keypad corresponding to the through hole is provided with a press projection for pressing a contact point.

According to this invention, the entire back surface of the hard base is covered by the keypad made of the silicone rubber film. Therefore, the circuit board is prevented from directly contacting the hard base of the hard material. The keypad serves as a shock absorber between the hard base and the circuit board. When the entire back surface of the hard base is covered by the keypad made of the silicone rubber film, adhesion and airtightness to the circuit board can also be enhanced.

In the cover member for the push-button switch according to the present invention, preferably, a portion of the keypad exposed through the through hole of the hard base forms the key top.

When the key top for manipulation of the switch is formed integrally with the keypad, there is no need for effort of bonding the key top separately formed, to the keypad. This improves the working efficiency and enables provision of a less expensive push-button switch cover member.

In the cover member for the push-button switch according to the present invention, preferably, the front surface of the keypad exposed through the through hole of the hard base is provided with the key top made of a hard resin.

When the key top for manipulation of the switch is made of the hard resin, it is feasible to make steady a touch of the key top in contact with a finger during manipulation, and it becomes feasible to provide the cover member for the push-button switch resistant to occurrence of erroneous manipulation or the like.

In the cover member for the push-button switch according to the present invention, preferably, the hard base is made of a polycarbonate resin, and the silicone rubber film is made of a selectively adhesive silicone rubber containing an additive of an auxiliary agent to be chemically bonded to the polycarbonate resin.

This can dispense with a step of applying an adhesive between the hard base and the keypad, or a step of performing a grounding treatment such as application of a primer or modification of a surface. Therefore, the working efficiency can be improved.

In the cover member for the push-button switch according to the present invention, preferably, a groove is formed between through holes adjacent to each other on the back side of the hard base.

This permits the silicone rubber to be injected into a mold over a chargeable amount necessary for molding of the keypad shape. Namely, excess silicone rubber over the chargeable amount can be accommodated in a space made by the groove. Therefore, it becomes feasible to inject the silicone rubber over the chargeable amount into the mold, in consideration of error in injection amount of the silicone rubber, whereby the silicone rubber can be certainly molded into the keypad shape.

In the cover member for the push-button switch according to the present invention, preferably, the hard base is made of an optically transparent resin.

This permits the hard base of the optically transparent resin to be used as a lightguide member, and it thus becomes feasible to add a design with a broader range of light to the cover member for the push-button switch. This results in enhancing the design of portable terminal equipment incorporating the cover member for the push-button switch. Furthermore, when the hard base is decorated by printing, painting, or the like, it becomes feasible to meet a variety of user tastes.

A production method of a push-button switch cover member according to the present invention is a method of producing the cover member for the push-button switch as defined above, the method comprising the steps of: inserting the hard base preliminarily shaped and decorated, in a mold; and thereafter filling the mold with a silicone rubber containing a component highly adhesive to the hard base, and heating and curing the silicone rubber, thereby integrating the hard base and the keypad.

Another production method of a push-button switch cover member according to the present invention is a method of producing the cover member for the push-button switch as defined above, the method comprising the steps of: inserting the hard base preliminarily shaped and decorated, in a mold; thereafter filling the mold with a silicone rubber containing a component highly adhesive to the hard base, and heating and curing the silicone rubber, thereby integrating the hard base and the keypad; and thereafter bonding and fixing the key top to the front surface of the keypad exposed through the through hole of the hard base.

According to these aspects of the invention, the material with high adhesion to the hard base can be preliminarily mixed in the silicone rubber, whereby the hard base and the keypad can be integrated in the step of forming the silicone rubber. Therefore, it becomes easy to perform the step of bonding the keypad to the hard base, and this enhances productivity. As a result, the cover member for the push-button switch can be produced at low cost.

In the production method of the push-button switch cover member according to the present invention, preferably, the hard base is made of a polycarbonate resin, and the silicone rubber film is made of a selectively adhesive silicone rubber containing an additive of an auxiliary agent to be chemically bonded to the polycarbonate resin.

This results in integrating the hard base made of the polycarbonate resin and the keypad made of the selectively adhesive silicone rubber, whereby the hard base and the keypad can be firmly bonded to each other without intervention of an adhesive. Therefore, it can dispense with a step of applying an adhesive between the hard base and the keypad, or a step of performing a grounding treatment such as application of a primer or modification of a surface. Therefore, the working efficiency can be improved.

In the production method of the push-button switch cover member according to the present invention, preferably, a heating temperature in the heating step is not less than a temperature necessary for curing the selectively adhesive silicone rubber and not more than a deflection temperature under load of the hard base.

This makes it feasible to cure the silicone rubber at the heating temperature not less than the temperature necessary for curing of the selectively adhesive silicone rubber and not more than the deflection temperature under load of the hard base, in forming the cover member for the push-button switch. Therefore, it is feasible to suppress deformation of the polycarbonate resin.

In the production method of the push-button switch cover member according to the present invention, preferably, the mold in which the hard base is inserted, is a movable mold opposed to a fixed mold having a gate for injection of a material, and after the step of integrating the hard base and the keypad, the movable mold is moved, and the integrated hard base and keypad attached to the movable mold are detached therefrom.

This permits the push-button switch cover member to be formed in a state in which the back side of the hard base entirely covered by the silicone rubber film is placed on the movable mold and in which the front side of the hard base of the polycarbonate resin not covered by the silicone rubber film is placed on the fixed mold. It is noted herein that the silicone rubber film is more adhesive to the mold than the polycarbonate resin. Therefore, when the movable mold is moved after molding, the molded product can be securely attached to the movable mold. Therefore, the working efficiency can be improved and productivity is enhanced.

Effect of the Invention

The push-button switch cover member and the production method thereof according to the present invention alleviate the influence on the circuit board due to an impact on the hard base and deformation of the hard base.

| Description of Reference Symbols | |
|---|---|
| 1 | hard base |
| 2 | keypad |
| 3 | key top |
| 4 | through hole |
| 5 | groove |
| 6a | press projection |

-continued

Description of Reference Symbols

| 6b | raised part |
|---|---|
| 7 | lightguide |
| 50 | movable mold |
| 60 | fixed mold |
| 61 | gate |

BEST MODE FOR CARRYING OUT THE INVENTION

Embodiments of the push-button switch cover member and the production method thereof according to the present invention will be described below on the basis of the drawings.

Figure 1:
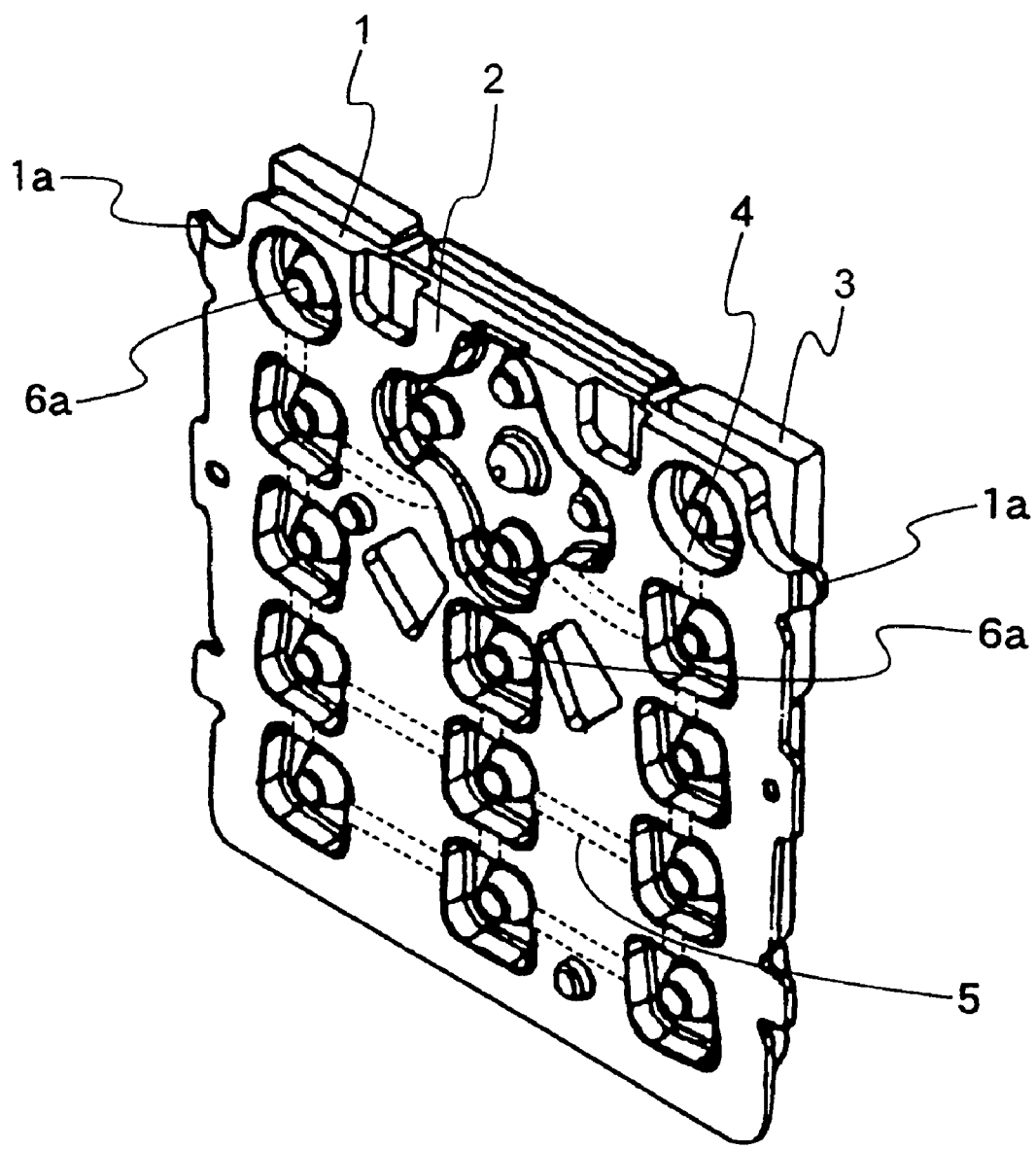
FIG. 1 is a perspective view showing a back surface of a cover member for push-button switches according to an embodiment.
Figure 2:
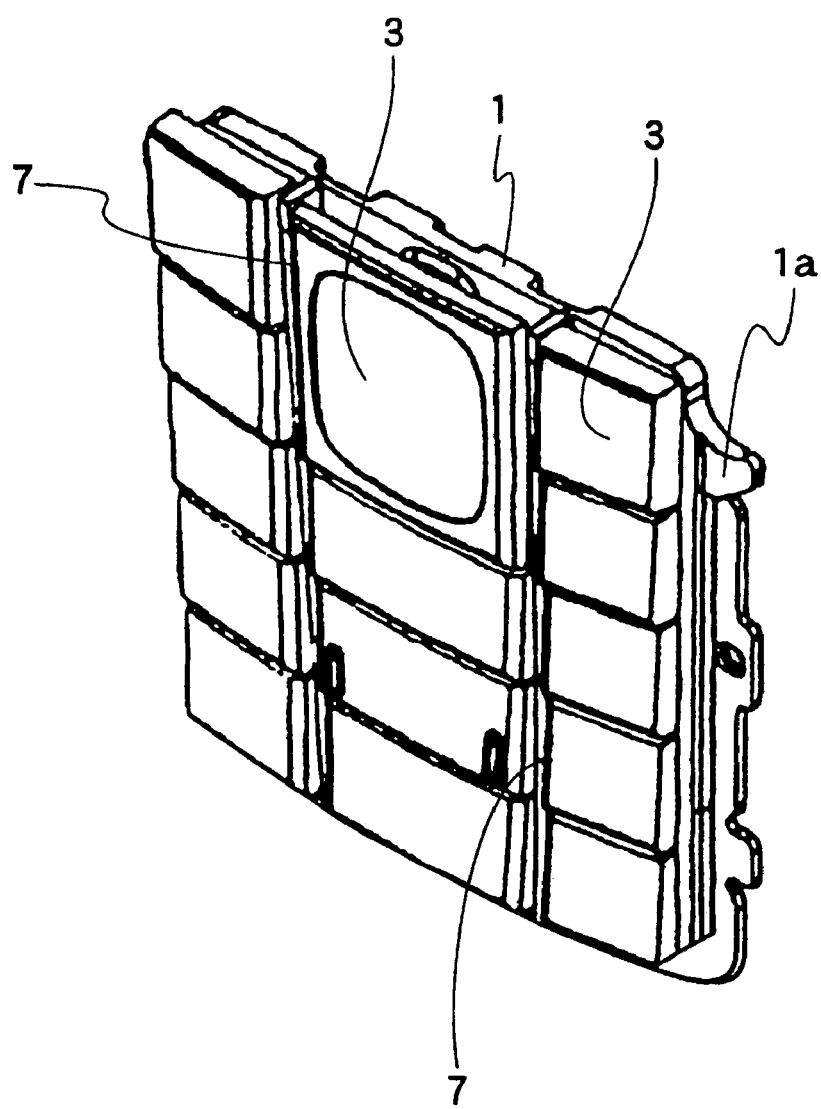
FIG. 2 is a perspective view showing a front surface of the cover member for push-button switches.
Figure 3:
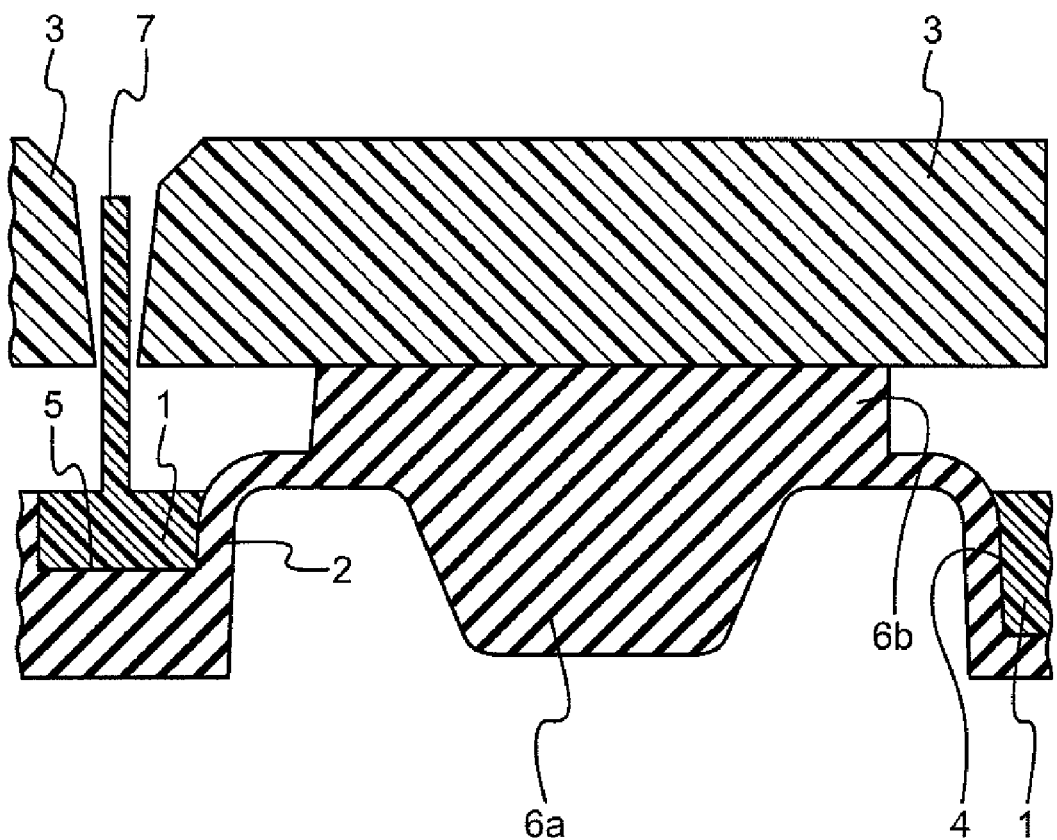
FIG. 3 is a sectional view of major part of the cover member for push-button switches.

The cover member for push-button switches in the present embodiment will be described with reference to FIGS. 1 to 3. FIG. 1 is a perspective view showing a back surface of the cover member for push-button switches in the present embodiment. FIG. 2 is a perspective view showing a front surface of the cover member for push-button switches. FIG. 3 is a sectional view of major part of the cover member for push-button switches.

As shown in FIGS. 1 to 3, the cover member for push-button switches has a hard base 1, a keypad 2, and key tops 3.

The hard base 1 is made of a transparent polycarbonate resin. The use of the transparent polycarbonate resin permits the hard base to be used as a lightguide member. Therefore, it becomes feasible to add a design with a broader range of light to the cover member for push-button switches. This results in enhancing the design of portable terminal equipment incorporating the cover member for push-button switches. Furthermore, when the hard base is decorated by printing, painting, or the like, it becomes feasible to meet a variety of user tastes.

The hard base 1 is provided with a number of through holes 4 for key tops. The front surface of keypad 2 is bonded to the entire back surface of the hard base 1, without intervention of an adhesive.

Shallow grooves 5 are formed everywhere on the back side of the hard base 1. Each groove 5 is formed between through holes 4 adjacent to each other in the hard base 1. This configuration facilitates flow of silicone rubber solution during production of the cover member for push-button switches. The grooves 5 of the hard base 1 will be described later in detail.

The hard base 1 is provided with fixed projections 1a at several locations in the periphery. The fixed projections 1a are provided as fixing members used when the cover member for push-button switches is combined with a circuit board to assemble a cell phone. This can improve static stability of the cell phone after assembled.

The keypad 2 is made of a semi-transparent silicone rubber film with a small thickness. This silicone rubber film will be described later in detail. The keypad 2 is formed on the back surface of the hard base 1 and thinly covers the back surface of the hard base 1. The keypad 2 formed on the back surface of the hard base 1 passes through the internal periphery of each through hole 4 in the hard base 1 to reach the front surface side of the hard base 1.

The keypad 2 becomes thicker in cone shape in the region inside each through hole 4 and this thicker part forms a press projection 6a for press of a contact part. A raised part 6b is formed as a pedestal for each key top 3, on the front surface of the keypad 2 located above the press projection 6a. The raised part 6b is raised thicker in a range a little inside the inner periphery of each through hole 4 and is projecting a little more than the front surface of the hard base 1.

Each key top 3 made of a hard resin is bonded to a front surface of the raised part 6b of the keypad 2. This key top 3 is formed a little larger than the inner periphery of the through hole 4 in order to prevent the key top from collapsing into the through hole 4. Each key top 3 has a stroke length equal to a projecting size, and elastically presses the keypad 2. Since the key tops 3 are made of the hard resin, the key tops can provide a steady touch in contact with a finger during manipulation. This enables provision of the cover member for push-button switches resistant to occurrence of erroneous manipulation or the like.

Lightguide 7 projecting from the front surface of the hard base 1 is routed in a stripe pattern in part of regions between mutually adjacent key tops 3. When the lightguide 7 is provided in this manner, it can illuminate the surroundings of the key tops 3 even in the dark.

The silicone rubber film forming the keypad 2 is made of a selectively adhesive silicone rubber containing an additive of an auxiliary agent to be chemically bonded to the polycarbonate resin. The selectively adhesive silicone rubber has a selective adhesion property that it firmly adheres to thermoplastic resin such as polycarbonate resin but does not adhere to metal molds.

The selectively adhesive silicone rubber is preferably one having the following composition: (a) alkenyl-containing organo polysiloxane, (b) organo hydrogen polysiloxane having at least two hydrogen atoms directly bonded to a silicon atom in one molecule, (c) addition reaction catalyst, and (d) adhesion provider (cf. Japanese Patent No. 2687832). Particularly, it is preferably a compound containing a group selected from a group having at least one hydrogen atom directly bonded to a silicon atom, in one molecule and having a phenyl skeleton, an alkoxysilyl group, a glycidyl group, and an acid anhydride group. Among them, it is particularly preferably a compound having at least one, more preferably at least two, Si—H group and at least one phenyl skeleton in one molecule.

Specifically, the selectively adhesive silicone rubber is, for example, X-30-3511u (available from Shin-Etsu Chemical Co., Ltd.). For example, another example of the selectively adhesive silicone rubber is a mixture containing 1 part by weight of an addition reaction type cross-linker (C-25A; Shin-Etsu Chemical Co., Ltd.), one part by weight of an adhesion reaction type cross-linker (C-25B; Shin-Etsu Chemical Co., Ltd.), and one part by weight of a compound represented by Chemical Formula 1 below, relative to 100 parts by weight of a silicone rubber compound (KE9510-U; Shin-Etsu Chemical Co., Ltd.).

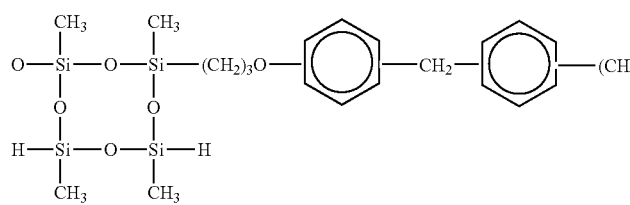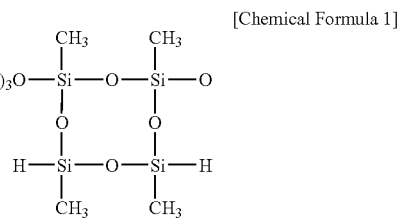

[Chemical Formula 1]

Furthermore, for example, the selectively adhesive silicone rubber can also be a mixture containing 1 to 100 parts by weight of a reinforcing silica fine powder, and 0.1 to 50 parts by weight of an organic compound or organosilicon compound having at least one aromatic ring in a molecule in the epoxy equivalent of 100-5000 g/1 mol, relative to 100 parts by weight of an organo polysiloxane composition of a thermal curing type.

In general, methods of integrating silicone rubber and plastic include an integrating method of performing a grounding treatment such as application of a primer or surface modification, and a method of integrating them through an adhesive. By using the selectively adhesive silicone rubber in the present embodiment, however, the silicone rubber and plastic can be firmly bonded to each other, without performing a grounding treatment or without intervention of an adhesive. Namely, the present embodiment uses the selectively adhesive silicone rubber for the keypad 2 and the optically transparent polycarbonate resin for the hard base 1, whereby the keypad 2 and hard base 1 can be bonded to each other without performing a grounding treatment or without intervention of an adhesive. This dispenses with the grounding treatment step or bonding step, and thus improves the working efficiency. It can also eliminate instability of a bonding state due to uncertainty of the grounding treatment.

Since in the present embodiment the silicone rubber film with excellent durability and elasticity is formed between the hard base 1 and the circuit board, no hard material is in direct contact with the circuit board. Namely, the silicone rubber film generally has an excellent shock absorbing property and, therefore, where the cover member for push-button switches in the present embodiment is applied to a cell phone or the like, it can provide a high prevention effect of preventing mechanical damage of the circuit board or the like. Since the silicone rubber film also has excellent adhesion to the circuit board, it can enhance airtightness and thus provide high dust-proof effect and drip-proof and water-proof effect.

The grooves 5 in the hard base 1 are provided for accommodating excess silicone rubber injected into a mold. In general, in the case of injection molding of products with a mold, there occurs some error in an amount of silicone rubber injected into the mold. Therefore, the silicone rubber must be molded in the shape of keypad 2 with certainty even if the injected amount is reduced because of the error. For this reason, the silicone rubber needs to be injected by an amount a little larger than the essentially required injection amount. On the other hand, the excess of silicone rubber injected a little larger than the chargeable amount needs to be made to flow into places where it does not deteriorate the function of products. In the present embodiment, therefore, the excess of silicone rubber over the chargeable amount is designed to be accommodated in spaces formed by the grooves 5. This permits the silicone rubber to be molded into the shape of keypad 2 with certainty.

The width of the grooves 5 in the hard base 1 is preferably not less than 0.5 mm nor more than the width of through holes 4. The depth of the grooves 5 is preferably not less than 0.1 mm nor more than 30% of the thickness of the hard base 1 (i.e., a level enough to secure rigidity of the hard base) and is more preferably not less than 0.2 mm. The grooves 5 are preferably provided between corners of respective through holes 4 of rectangular shape. This configuration can prevent bubbles from remaining in the mold. This effect arises from the fact that the gate of the mold is located above the center of each key top 3 and thus the silicone rubber injected spreads from the center to the periphery of key top 3. However, the grooves 5 may also be provided between centers of respective through holes 4 if it is difficult to locate the grooves 5 between corners of respective through holes 4 for the reason of space.

By properly designing the width, depth, etc. of the grooves 5 in the hard base 1, it becomes feasible to adjust molding conditions in molding of keypad 2. This enables efficient production of products with high quality. The silicone rubber film becomes thicker in the regions corresponding to the portions of grooves 5 than in the other regions, by an amount equivalent to the depth of the grooves 5. Even if the hard base 1 is so deformed as to warp, the silicone rubber film of the above structure can reduce the amount of the deformation.

A method of producing the cover member for push-button switches in the above embodiment will be described below.

The hard base 1 of desired shape and color is preliminarily molded by injection molding or the like, using an optically transparent hard resin such as polycarbonate resin. This hard base 1 is provided with a number of through holes 4.

Next, the hard base 1 preliminarily molded and decorated is inserted in a mold with engraving to define the shape of keypad 2.

Thereafter, the mold with the hard base 1 being inserted is filled with the selectively adhesive silicone rubber, and the silicone rubber is heated and cured to integrate the hard base 1 and the keypad 2.

Subsequently, the semi-finished product consisting of the hard base 1 and the keypad 2 integrated is taken out of the mold. Then the key tops 3 preliminarily separately molded and decorated are bonded through an adhesive to surfaces of raised parts 6b of the keypad 2 exposed through the through holes 4 of the semi-finished product. This obtains a final cover member for push-button switches.

The heating temperature in the step of filling the mold with the selectively adhesive silicone rubber and heating it is preferably a temperature not less than the temperature necessary for curing of the selectively adhesive silicone rubber and not more than a deflection temperature under load of the polycarbonate resin forming the hard base 1.

The temperature necessary for curing of the selectively adhesive silicone rubber is determined based on whether a time necessary for arrival of the curing level of the selectively adhesive silicone rubber at 90% is a time tolerated in the production step. The time necessary for arrival of the curing level of the selectively adhesive silicone rubber at 90% can be measured by a well-known rheometer.

Now, let us explain a time necessary for arrival of the curing level of the selectively adhesive silicone rubber at 10% (T10) and a time necessary for arrival of the curing level of the selectively adhesive silicone rubber at 90% (T90), at each of heating temperatures. Each of the times described below is an experimental value measured with a rheometer by the Inventor of the present invention.

With the heating temperature of 100° C., T10 was 210 seconds and T90 339 seconds. With the heating temperature of 110° C., T10 was 117 seconds and T90 210 seconds. With the heating temperature of 120° C., T10 was 72 seconds and T90 was 120 seconds. Furthermore, with the heating temperature of 130° C., T10 was 48 seconds and T90 was 105 seconds.

This result proves that the time necessary for arrival of the curing level of the selectively adhesive silicone rubber at 90% becomes shorter with increase in the heating temperature. Namely, the higher the heating temperature, the shorter the curing time of the selectively adhesive silicone rubber becomes, and, in turn, the more the working efficiency is improved. For example, in a case where the curing time of the selectively adhesive silicone rubber is set to within 3 minutes (180 seconds), the heating temperature is preferably set to 120° C. or higher; in a case where the curing time of the selectively adhesive silicone rubber is set to within 4 minutes (240 seconds), the heating temperature is preferably set to 110° C. or higher.

In contrast to it, since the polycarbonate resin as a material of the hard base 1 is a thermoplastic resin, it becomes easier to deform with increasing temperature. Therefore, the heating temperature is preferably as low as possible. For setting the heating temperature, it is preferable to set the heating temperature within a range in which a deflection amount of polycarbonate resin does not exceed a standard deflection amount, based on the deflection temperature under load. Here the deflection temperature under load (ASTM (American Society for Testing and Materials) D-648) is represented, for example, by a temperature at the load stress of 1.82 MPa or by a temperature at the load stress of 0.45 MPa. In general, the deflection temperature under load increases with decrease in load stress. As described above, the curing time of the selectively adhesive silicone rubber decreases with increase in the heating temperature. Therefore, taking these into consideration, the heating temperature is preferably not more than the deflection temperature under load at the load stress of 0.45 MPa. However, where emphasis is placed on increase in a rate of high-quality products, the heating temperature is preferably not more than the deflection temperature under load at the load stress of 1.82 MPa.

The deflection temperature under load of polycarbonate resin is approximately 130-136° C. at the load stress of 1.82 MPa and approximately 136-142° C. at the load stress of 0.45 MPa.

Conventionally, the heating temperature of 150° C. or higher was needed for integrating the silicone rubber and polycarbonate resin. This was because the silicone rubber had to be heated at the temperature of at least 150° C. in order to cure the silicone rubber. In contrast to it, since the present invention uses the selectively adhesive silicone rubber, it becomes possible to cure the silicone rubber at the heating temperature (e.g., 130° C. or lower) lower than the deflection temperature under load of the polycarbonate resin. This can suppress deformation of polycarbonate resin.

Figure 4:
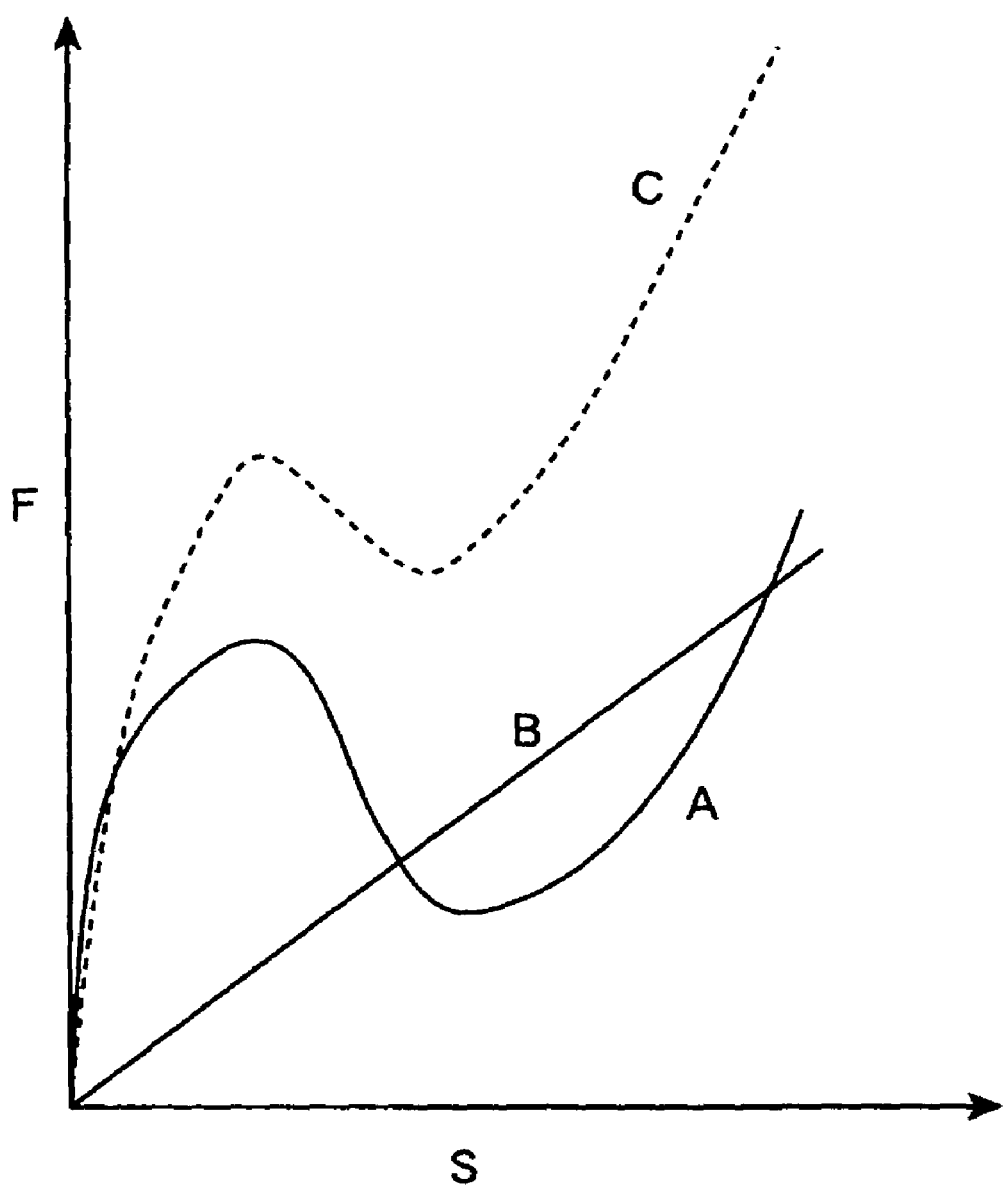
FIG. 4 is a graph showing the relationship of touch against stroke length and repulsive force, in press of a key top of the cover member for push-button switches.

FIG. 4 is a graph for explaining the touch upon press of a key top, based on the relationship between stroke length and repulsive force.

In the graph shown in FIG. 4, the horizontal axis represents the stroke length S and the vertical axis the repulsive force F. When a press projection 6a of keypad 2 depresses a disc spring on the circuit board, the repulsive force F of the disc spring is represented by a cubic curve having a local maximum and a local minimum as indicated by A in FIG. 4, in the relationship with the stroke length S. The repulsive force F of the silicone rubber film is generally represented by an approximately linear line as indicated by B in FIG. 4, in the relationship with the stroke length S. When the silicone rubber film is mounted on the back surface of the hard base 1, the repulsive force F thereof is represented by a cubic curve having a local maximum and a local minimum as indicated by C in FIG. 4, in the relationship with the stroke length S. This cubic curve is represented as a result of addition of the repulsive force F of the disc spring and the repulsive force F of the silicone rubber film described above. In this case, therefore, a relatively large repulsive force can be obtained even with a small stroke S upon press of key top 3. For this reason, a good click feeling is obtained upon press of key top 3, so as to enhance manipulation performance of key top 3.

In the above-described embodiment each key top 3 of hard resin preliminarily molded and decorated is bonded to a portion of the keypad 2 exposed through the through hole 4 of hard base 1, but the method of forming the key tops is not limited to this. For example, a portion of the keypad 2 exposed through each through hole 4 of the hard base 1 may be shaped in a desired key top shape.

Figure 5:
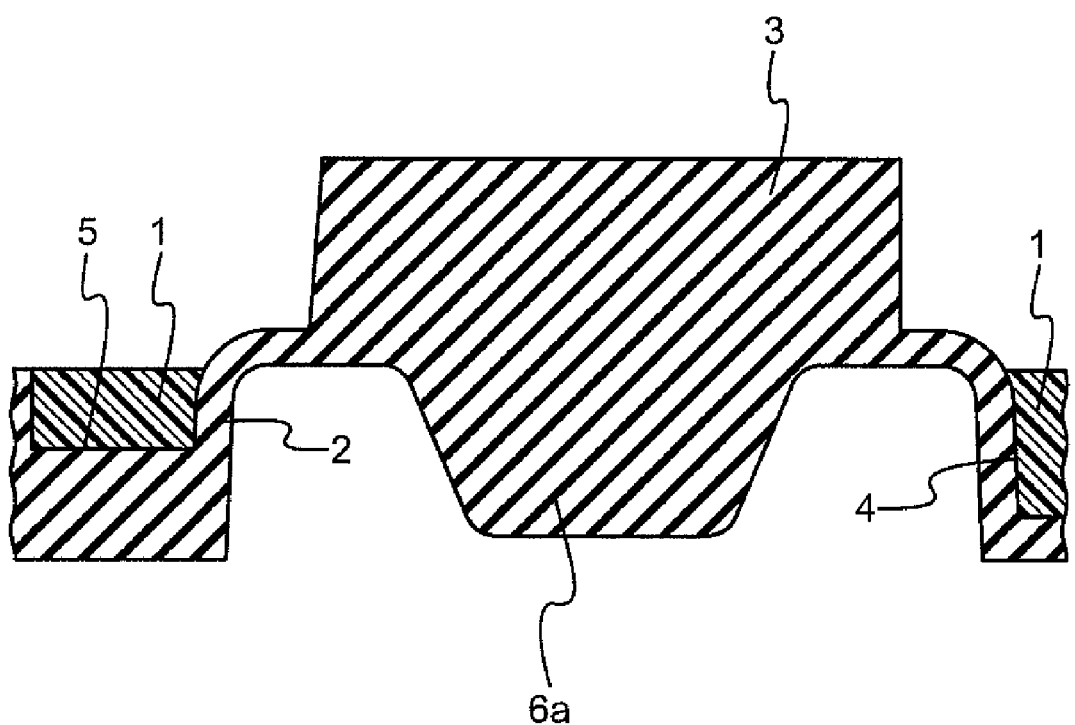
FIG. 5 is a sectional view of major part in a case where a portion of a keypad exposed through a through hole of a hard base in the cover member for push-button switches, serves as a key top.

FIG. 5 is a sectional view of major part in a case where a portion of keypad 2 exposed through each through hole 4 of the hard base 1 is made as a key top 3.

In this case, there is no need for preliminarily molding and decorating the key tops 3 separately. Therefore, this method dispenses with the step of bonding the key tops 3 to the surfaces of the raised parts 6b of the keypad 2. This can improve the working efficiency and enables provision of the cover member for push-button switches at cost reduced by that degree.

Just as in the case of the above embodiment, the hard base 1 is made of a transparent resin, whereby the hard base 1 exposed between adjacent key tops 3 and around the key tops 3 can be used as a lightguide member. This can add a design with a broader range of light to the cover member for push-button switches. Namely, it is feasible to enhance the design of portable terminal equipment incorporating the cover member for push-button switches. Furthermore, if the hard base 1 is decorated by printing, painting, or the like, it is feasible to meet a variety of user design tastes.

In the aforementioned embodiment the silicone rubber film is formed over the entire back surface of the hard base 1, but the silicone rubber film does not always have to be formed over the entire back surface. Namely, the silicone rubber film may be formed in part on the back side of the hard base 1 as long as it can alleviate the influence on the circuit board due to the impact on the hard base and the deformation of the hard base. However, since cushioning characteristics are more enhanced with the silicone rubber film being formed over the entire back surface of the hard base 1, the influence can be alleviated more on the circuit board due to the impact on the hard base and the deformation of the hard base.

The aforementioned embodiment involves the configuration wherein the silicone rubber film is formed over the entire back surface of the hard base 1 and wherein the grooves 5 are provided on the back side of the hard base 1, but the grooves 5 do not always have to be provided where the silicone rubber film is formed over the entire back surface of the hard base 1. This is because a space provided between the hard base 1 and the mold (space provided for formation of the silicone rubber film over the entire back surface of the hard base 1) can be utilized as a space for accommodating the excess of silicone rubber injected into the mold. Where the excess of silicone rubber is accommodated in the space provided between the hard base 1 and the mold, there can occur a situation in which the silicone rubber film is not formed over the entire back surface of the hard base 1. However, the silicone rubber film does not always have to be formed over the entire back surface of the hard base 1 as long as it can alleviate the influence on the circuit board due to the impact on the hard base and the deformation of the hard base, as described above. Namely, even in the case where the silicone rubber film is formed only in part on the back side of the hard base 1, it is possible to achieve the object of the present invention and to provide the effect of the present invention.

Incidentally, in the case where reduction of thickness of products is given higher priority than cushioning characteristics, it is preferable that the silicone rubber film be minimized on the back side of the hard base 1. However, without the silicone rubber film on the back side of the hard base 1, the hard base 1 is in direct contact with the circuit board, and it is thus difficult to alleviate the influence on the circuit board due to the impact on the hard base and the deformation of the hard base. Therefore, a method of realizing reduction of thickness of products while protecting the circuit board will be described below.

This method is to provide the hard base 1 with the grooves 5 and to eliminate the need for the scheme for forming the silicone rubber film over the entire back surface of the hard base 1. In general, the silicone rubber of thermosetting resin requires some time from a start of heating to curing. Therefore, the silicone rubber with fluidity filled in the grooves 5 of the hard base 1 during the injection molding flows into the back surface of the hard base 1 before cured. This results in inevitably forming a thin silicone rubber film (approximately 0.01 mm) on the entire surface or in part on the back side of the hard base 1.

With use of this principle, the thin silicone rubber film can be formed on the back side of the hard base 1 by providing the back side of the hard base 1 with the shallow grooves 5, without providing a special scheme for forming the silicone rubber film over the entire back surface of the hard base 1. Namely, during the injection molding with an injection mold, the thin silicone rubber film can be formed over the entire surface or in part on the back side of the hard base 1, without providing the entire back surface of the hard base 1 with a space for forming the silicone rubber film. This can avoid an accident of direct contact between the hard base 1 and the circuit board, thereby protecting the circuit board. Since the thickness of the silicone rubber film formed on the back side of the hard base 1 is extremely thin, this method can also contribute to reduction of thickness of products.

In the case of eliminating the use of the scheme for forming the silicone rubber film over the entire back surface of the hard base 1, a rib for accommodating excess silicone rubber may be separately provided outside the outermost peripheral part of products. In this case, it is preferable to provide a so-called cutoff (a thin part for cutting the rib off) between the rib and product. This is because the provision of the cutoff enables the rib filled with the excess of silicone rubber to be readily cut off from the product. When the rib is provided outside the outermost peripheral part of the product, the base material can be prevented from being damaged by a burr generated in the cutoff part.

Finally, effects provided by forming the silicone rubber film on the back side of the hard base 1 will be described together below.

(1) First, when the silicone rubber film is formed on the back side of the hard base 1, it absorbs unevenness on the circuit board and enhances the cushioning characteristics. For this reason, it is feasible to alleviate the influence on the circuit board due to the impact on the hard base and the deformation of the hard base. The thickness of the silicone rubber film is preferably about 0.01-0.4 mm. Further, in view of good cushioning characteristics of the film, the thickness is more preferably about 0.1 to 0.4 mm.

(2) When the silicone rubber film is formed on the back side of the hard base 1, it becomes easy to form a decorative layer.

In general, the decorative layer formed by printing, painting, or the like is formed in the upper layer part of a product in order to achieve good appearance of patterns or the like. Therefore, for example, in the conventional products in which the silicone rubber film is formed on the hard base, the decorative layer is formed on the silicone rubber film. This decorative layer in the conventional products is formed on the silicone rubber film after the hard base and the silicone rubber film are integrally molded.

However, since the surface of the silicone rubber film is generally uneven, it is difficult to form the decorative layer by screen printing, and there are thus restrictions on the printing method. When the decorative layer is formed by painting, portions not to be painted (e.g., the surfaces to which the key tops are bonded) need to be masked, which degrades the working efficiency. Furthermore, for forming the decorative layer on the silicone rubber film, materials are limited to ink and coating materials with silicone nature compatible with the silicone rubber. Since the ink and coating materials with silicone nature are thermosetting, they need to be heated during formation of the decorative layer. On the other hand, the hard base (polycarbonate resin) integrally molded with the silicone rubber film is thermoplastic, and thus weak to heat, and will be deformed when repeatedly heated. As described above, various problems will arise where the decorative layer is formed on the silicone rubber film.

In contrast to it, since in the present invention the silicone rubber film is formed on the back side of the hard base 1, the decorative layer can be preliminarily formed on the hard base 1 before the hard base 1 and the silicone rubber are integrally molded. Therefore, it is easy to perform the painting without need for masking. Since the front surface of the hard base 1 is smooth and even, it is easy to perform screen printing thereon. Furthermore, the polycarbonate resin forming the hard base is compatible with a variety of ink and coating materials, and thus offers a wide selection range of ink and coating materials. Therefore, it is also feasible to use thermoplastic ink and coating materials and in this case, the decorative layer can be formed at low temperature. This permits the decorative layer to be readily formed without deformation of the hard base (polycarbonate resin) even in the case where the decorative layer is formed on the hard base after the hard base and silicone rubber are integrally molded.

(3) Furthermore, when the silicone rubber film is formed on the back side of the hard base 1, a half-finished product in which the hard base 1 and the silicone rubber film are integrally molded by a mold can be attached to a movable mold forming the mold.

In general, the mold is composed of a fixed mold with a gate, and a movable mold opposed to the fixed mold. Then the upper part (e.g., the raised parts 6b) side of a half-finished product is formed by the fixed mold with the gate, and the lower part (e.g., the press projections 6a) side of the half-finished product by the movable mold. After the half-finished product is molded, the gate part is cut off from the half-finished product and thereafter the movable mold is moved. Then the half-finished product attached to the movable mold is taken out of the mold. Namely, the half-finished product separated from the gate part is attached to the movable mold and is taken out of the movable mold by means of a robot or the like. Therefore, unless the half-finished product always attaches to the movable mold, the working efficiency will be significantly lowered. For this reason, it is necessary to securely attach the half-finished product to the movable mold.

In the present invention the silicone rubber film is formed on the entire back surface on the lower part side of the half-finished product and most of the surface on the upper part side of the half-finished product is formed of the hard base of polycarbonate. The silicone rubber film is more adhesive to the mold than the polycarbonate resin. Therefore, the lower part side of the half-finished product with the larger surface area of the silicone rubber film is more likely to be attached to the mold. This causes the half-finished product thus molded, to be securely attached to the movable mold when the movable mold is moved after the molding of the half-finished product. Therefore, the working efficiency can be improved, so as to enhance productivity.

Figure 6:
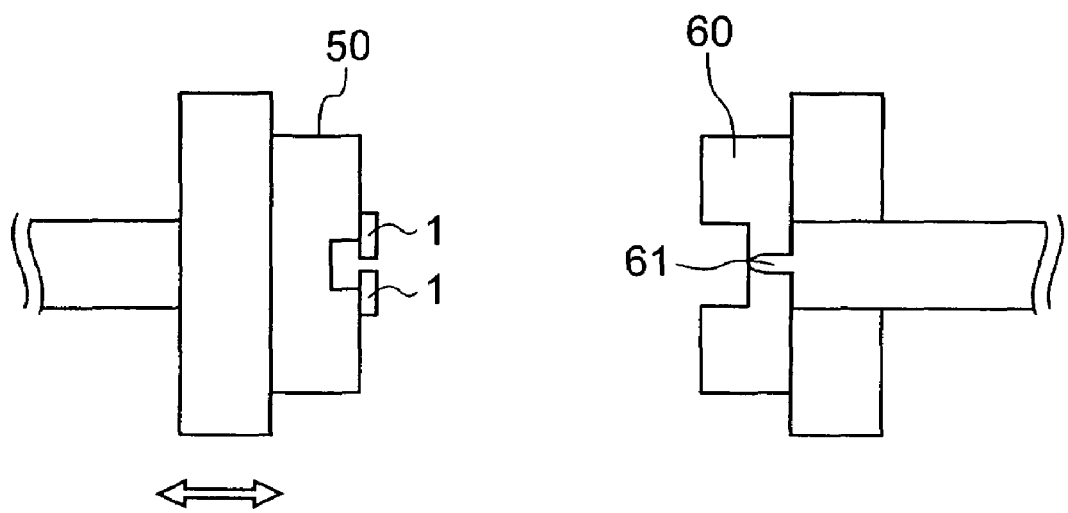
FIG. 6 is an illustration for explaining molds for molding of half-finished products.
Figure 7:
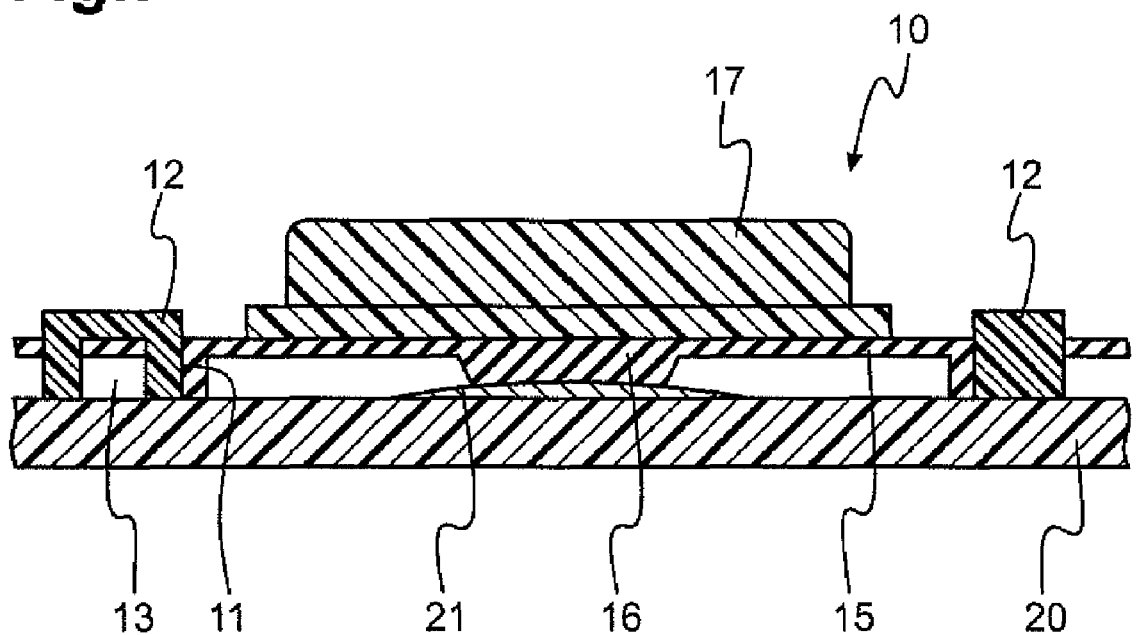
FIG. 7 is a sectional view of major part of a conventional luminescent cover.

The mold for molding the aforementioned half-finished product will be described below with reference to FIG. 6. As shown in FIG. 6, the mold is a mold to be attached to a horizontal molding machine, and is roughly composed of a movable mold 50, and a fixed mold 60 opposed to the movable mold 50. The fixed mold 60 is provided with a gate 61 for injection of a material.

Using this mold, the cover member for push-button switches is produced according to the following procedure. First, the hard base 1 is placed on the movable mold 50. Then the movable mold 50 is moved toward the fixed mold 60. After the movable mold 50 is moved to a predetermined position, the selectively adhesive silicone rubber is injected from the gate 61 of the fixed mold 60. Then the selectively adhesive silicone rubber filled in the mold is heated and cured to integrate the hard base 1 and the keypad 2, thereby forming a half-finished product. Then the movable mold 50 is moved in a direction away from the fixed mold 60 and the half-finished product attaching to the movable mold 50 is taken off the mold. The key tops are bonded to this half-finished product thus taken off, thereby obtaining a cover member for push-button switches.

The mold shown in FIG. 6 is the mold to be attached to the horizontal molding machine, but it is needless to mention that the same effect can be achieved even by a mold to be attached to a vertical molding machine. In the mold to be attached to the vertical molding machine, generally, the fixed mold with the gate is located in the upper part and the movable mold in the lower part. Therefore, if the half-finished product should be attached to the fixed mold located in the upper part, wasteful effort for detaching the half-finished product from the fixed mold would be greater than in the case of the mold to be attached to the horizontal molding machine. Therefore, the effect of attaching the half-finished product to the movable mold in the mold to be attached to the vertical molding machine is more significant than that in the mold to be attached to the horizontal molding machine, and therefore the working efficiency can be greatly improved, so as to significantly enhance productivity.

The invention claimed is:

1. A cover member for a push-button switch comprising a hard base and a keypad,
    wherein the hard base is made of a hard resin with a through hole for a key top,
    wherein the keypad is made of a silicone rubber film, and a front surface of the keypad is in contact with an entirety of all back surfaces of the hard base, thereby preventing the entirety of all back surfaces of the hard base from being in contact with any member other than the keypad, and
    wherein the keypad is exposed through the through hole, and a back surface of the keypad corresponding to the through hole is provided with a press projection for pressing a contact point.

2. The cover member for the push-button switch according to claim 1, wherein a portion of the keypad exposed through the through hole of the hard base forms the key top.

3. The cover member for the push-button switch according to claim 1, wherein the hard base is made of a polycarbonate resin, and wherein the silicone rubber film is made of a selectively adhesive silicone rubber containing an additive of an auxiliary agent to be chemically bonded to the polycarbonate resin.

4. The cover member for the push-button switch according to claim 1, wherein the hard base is provided with at least one additional through hole, and a groove is formed between said through hole and one of the at least one additional through hole on a back side of the hard base.

5. The cover member for the push-button switch according to claim 1, wherein the hard base is made of an optically transparent resin.

6. The cover member for the push-button switch according to claim 1, wherein the front surface of the keypad exposed through the through hole of the hard base is provided with the key top, and wherein the key top is made of a hard resin.

7. A method of producing the cover member for the push-button switch as defined in claim 6, the method comprising the steps of:
    inserting the hard base preliminarily shaped and decorated, in a mold;
    thereafter filling the mold with a silicone rubber containing a component highly adhesive to the hard base, and heating and curing the silicone rubber, thereby integrating the hard base and the keypad; and thereafter bonding and fixing the key top to the front surface of the keypad exposed through the through hole of the hard base.

8. A method of producing the cover member for the push-button switch as defined in claim 1, the method comprising the steps of:
    inserting the hard base preliminarily shaped and decorated, in a mold; and
    thereafter filling the mold with a silicone rubber containing a component highly adhesive to the hard base, and heating and curing the silicone rubber, thereby integrating the hard base and the keypad.

9. The production method of the cover member for the push-button switch according to claim 8, wherein the mold in which the hard base is inserted, is a movable mold opposed to a fixed mold having a gate for injection of a material, and wherein after the step of integrating the hard base and the keypad, the movable mold is moved, and the integrated hard base and keypad attached to the movable mold are detached therefrom.

10. The production method of the cover member for the push-button switch according to claim 8, wherein the hard base is made of a polycarbonate resin, and wherein the silicone rubber film is made of a selectively adhesive silicone rubber containing an additive of an auxiliary agent to be chemically bonded to the polycarbonate resin.

11. The production method of the cover member for the push-button switch according to claim 10, wherein a heating temperature in the heating step is not less than a temperature necessary for curing the selectively adhesive silicone rubber and not more than a deflection temperature under load of the hard base.

* * * * *